(12) United States Patent
Zhang et al.

(10) Patent No.: US 8,336,641 B2
(45) Date of Patent: Dec. 25, 2012

(54) ELECTRIC TOOL

(75) Inventors: Shisong Zhang, Suzhou (CN); Wei Zhang, Suzhou (CN); Xiaotian Zeng, Suzhou (CN); Paolo Andriolo, Vicenza (IT)

(73) Assignee: Positec Power Tools (Suzhou) Co., Ltd. (CN)

( * ) Notice: Subject to any disclaimer, the term of this patent is extended or adjusted under 35 U.S.C. 154(b) by 90 days.

(21) Appl. No.: 12/865,538

(22) PCT Filed: Jan. 22, 2009

(86) PCT No.: PCT/CN2009/070274
§ 371 (c)(1),
(2), (4) Date: Jul. 30, 2010

(87) PCT Pub. No.: WO2009/097804
PCT Pub. Date: Aug. 13, 2009

(65) Prior Publication Data
US 2010/0319947 A1 Dec. 23, 2010

(30) Foreign Application Priority Data

Jan. 31, 2008 (CN) .......................... 2008 1 0005373

(51) Int. Cl.
*E21B 1/143* (2006.01)
(52) U.S. Cl. ........................... 173/216; 173/48; 173/217
(58) Field of Classification Search ............... 173/48, 173/104, 109, 216, 217; 279/61, 62, 64, 279/69; 408/239 R, 139
See application file for complete search history.

(56) References Cited

U.S. PATENT DOCUMENTS

| | | | | |
|---|---|---|---|---|
| 3,970,323 A | * | 7/1976 | Schnizler, Jr. | 279/64 |
| 5,431,419 A | * | 7/1995 | Mack | 279/62 |
| 5,499,830 A | * | 3/1996 | Schnizler | 279/62 |
| 5,765,839 A | * | 6/1998 | Rohm | 279/62 |
| 5,988,653 A | * | 11/1999 | Kuo | 279/62 |
| 6,588,246 B2 | | 7/2003 | Ko | |
| 6,805,206 B2 | | 10/2004 | Hanke | |
| 7,124,839 B2 | | 10/2006 | Furuta et al. | |

FOREIGN PATENT DOCUMENTS

| CN | 1063922 A | 8/1992 |
|---|---|---|
| CN | 2815560 Y | 9/2006 |

* cited by examiner

*Primary Examiner* — Stephen F Gerrity
*Assistant Examiner* — Nathaniel Chukwurah
(74) *Attorney, Agent, or Firm* — Factor Intellectual Property Law Group, Ltd.

(57) ABSTRACT

The present invention relates to a power tool comprises an adjusting mechanism, the adjusting mechanism comprising a station element defining at least a first engaged member, and an adjusting member rotated about a axis and driving the first engaged member to move elastically along the axis, wherein a frequency increase mechanism is disposed between the adjusting member and the station element, the frequency increase mechanism coupled to the first engage member, the frequency of the elastic moving of the first engage member increases when the adjusting member rotates about the axis. Because the adjusting mechanism can increase the sound frequency, so it can make precision and dense sound and remind of the operator when the adjusting member rotated.

7 Claims, 4 Drawing Sheets

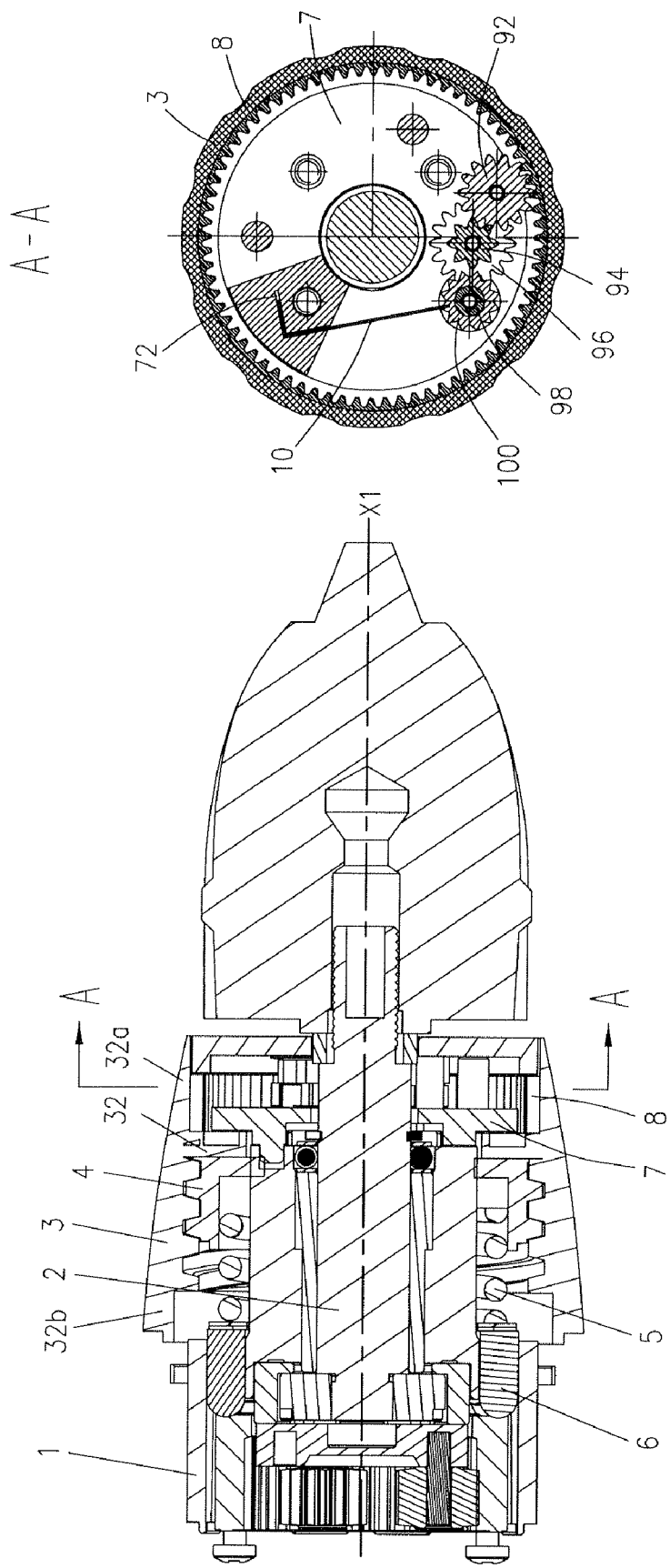

ELECTRIC TOOL

RELATED APPLICATIONS

This application claims the filing benefit of International Patent Application No. PCT PCT/CN2009/070274, filed Jan. 22, 2009, which claims the filing benefit of Chinese Patent Application No. 200810005373.2 filed Jan. 31, 2008, the contents of both are incorporated herein by reference.

FIELD OF THE INVENTION

The present invention relates to a power tool, and more particularly to a power tool such as an electric drill, a hammer, a router, a planer etc which suitably of used for rotating an adjustment member of the power tool to different situation during the operation of the power tool.

BACKGROUND OF THE INVENTION

A power tool can be adjusted by rotating and adjusting a control member to accommodate different situation during the operation of the power tool. For example, a torque adjusting sleeve of an electric drill can be rotated and adjusted to different output torques according to the operating load of the electric drill, a chuck of a hammer can be rotated and adjusted for adapting different bits, and a depth ruler of a router can be rotated and adjusted for suit different cutting depth, a planer is provided with a switch handle which is used for rotating and adjusting the distance between a front shoe and a rear shoe according to the cutting thickness of the planer. In fact, the operator hope to be reminded by some indicator when the adjustment member is rotating or adjusting during the operation, in case the operator performs incorrect operation and be not aware of the dangers. In general, the power tool works in the conditions accompanying with great vibration, the adjustment member of the power tool is easy to loose or reverse from its original position as the result of the vibration. It will be very easy to make dangers if the operator didn't get the caution in time. A power tool including a sound indicator for a adjustment member was disclosed in prior art, the frequency of the sound occurs at each revolution of the adjustment member is less than 25, the frequency of the sound is too lower to cause the operator to pay attention.

U.S. Pat. No. 6,805,206 discloses a hammer which includes a tool or a bit mounted on a spindle of the hammer, the hammer comprises a pair of ratchet wheels which enable impacting each other to cause sounds to remind of the operator when the tool or bit to be rotated to a determined orientation. As we know, the power tool is generally used for decorating or building and the environments full of noise, and the power tool itself also make a noise in use, the sound frequency of ratchet wheels of the hammer is about 20 (the times of a sound occurs at each revolution is about 20), the sound frequency is too lower to achieve the effect of remind.

SUMMARY OF THE INVENTION

One technical problem to be solved by the present invention is to provide a power tool which comprises an adjusting member that makes dense sounds when the adjusting member rotated about an axis.

A technical solution of the present invention is to provide a power tool comprising an adjusting mechanism, the adjusting mechanism comprises a station element defining at least a first engaged member and an adjusting member rotated about an axis and driving the first engaged member to move elastically along the axis, wherein a frequency increase mechanism is disposed between the adjusting member and the station element, the first engage member coupled to the frequency increase mechanism, the frequency of the elastic moving of the first engage member increases when the adjusting member rotates about the axis.

Typically the first engaged member moving elastically more than 40 times at each revolution of the adjusting member.

Typically the adjusting member provide an internal gear, the frequency increase mechanism comprises at least a group of speed increase mechanism, the speed increase mechanism coupled with the internal gear and the first engage member respectively.

Preferably the first engaged member formed as a metal spring tab with two ends, one end of the metal spring tab coupled with the station element fixedly, the other end engaged with the speed increase gear mechanism.

Preferably the station element defining a guide groove with two ends thereof one end is closed and the other end is opened, the first engaged member is movably received in the guide groove, one end of the first engaged member coupled with the closed end of the guide groove via a spring, the other end extend out off the guide groove and engaged with the speed increase gear mechanism.

Preferably a friction member is located between the speed increase gear mechanism and the station element which increase the friction force between the station element and speed increase gear mechanism.

In a preferred embodiment, the frequency increase mechanism comprises a ratchet ring, which located in the internal circumference of the adjusting member, the ratchet ring provide with more than 40 teeth disposed in the interior surface of the ratchet ring.

Preferably the first engaged member comprises a metal spring tab with two ends, one end of the metal spring tab couple with the station element fixedly, the other end engaged with the ratchet ring.

Preferably the station element defining a guide groove with two ends thereof one end is closed and the other end is opened, the first engaged member is movably received in the guide groove, one end of the first engaged member coupled with the closed end of the guide groove via a spring, the other end extend out off the guide groove and engaged with the ratchet ring.

In a preferred embodiment, the frequency increase mechanism comprises at least a second engage member which located on the station element, there are a phase difference between the second engage member and the first engage member, the adjusting member drives the second engage member and the first engage member in turn to moving elastically.

Preferably the frequency increase mechanism comprising two second engage members.

Preferably the phase difference between each proximate engage members of the first engage member and the second engage members is 5 degree.

Because the power tool of the invention provides an adjusting mechanism for increases the sound frequency, it makes precision and dense sound and remind of the operator when the adjusting member rotated.

BRIEF DESCRIPTION OF THE DRAWINGS

The present invention will be further described with reference to the torque sleeve of a drill together with the attached drawings, wherein:

FIG. 1 is a front view of a torque sleeve portion of a drill according to a first preferred embodiment of the present invention;

FIG. 2 is a cross-sectional view taking along line A1-A1 of FIG. 1;

DETAILED DESCRIPTION OF THE PREFERRED EMBODIMENT

Figure 3:
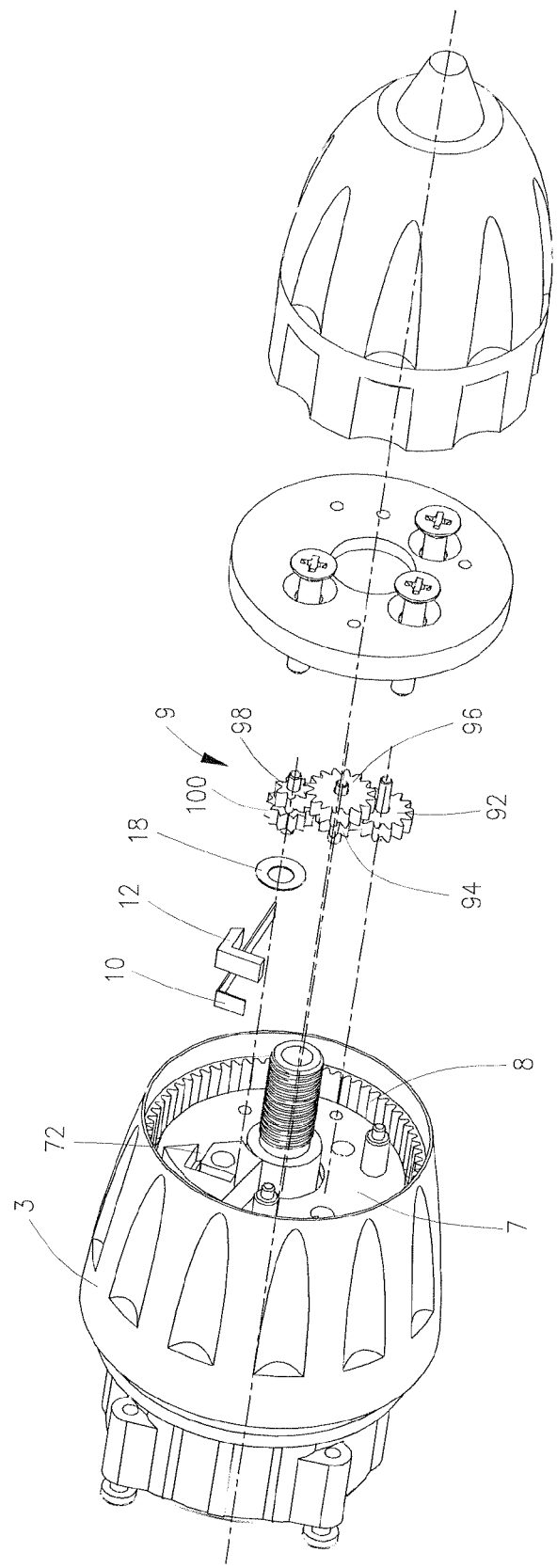
FIG. 3 is an exploded view of FIG. 1.

Referring to FIG. 1, a drill comprises a housing 1, a motor (not shown) contained in the housing 1, a shaft 2 is rotatably drived by the motor, a torque sleeve 3 is rotatably mounted on the housing 1 and has an axis X1. A flange 32 is formed on the interior of the torque sleeve 3, the torque sleeve 3 is divide into a front part 32a and a rear part 32b by the flange 32. A helix sleeve 4, a spring 5 and a clutch member 6 is received in the torque sleeve 3, the helix sleeve 4 coupled with the torque sleeve 3 via thread, the first end of the spring 5 press against the helix sleeve 4 and the second end of the spring 5 press against the clutch member 6. The helix sleeve 4 moves along the extended direction of the axis X1 when the torque sleeve 3 rotates about the axis X1, the clutch member 6 is biased by the spring 5. The compression deformation of the spring 5 is changed when the torque sleeve 3 rotate about the axis X1, so the force pressed on the clutch member 6 is changed, such that the output torque of the shaft 2 of the drill 2 is changed.

Referring to FIG. 2 and FIG. 3, a station element 7 and a internal gear 8 are located in the front part 32a of the torque sleeve 3, the station element 7 is coupled with the housing 1 and the internal gear 8 is fixedly engaged with the torque sleeve 3. A group of speed increase mechanism 9 is disposed on the station element 7. In the first preferred embodiment of the present invention, the group of speed increase mechanism 9 comprises a first gear 92 which engaged with the internal gear 8, a second gear 94 which engaged with the first gear 92, a third gear 96 which moves with the second gear 94 at the same angular speed, a fourth gear 98 which engaged with the third gear 96, and a ratchet wheel 100 which moves with the fourth gear 98 at the same angular speed, the ratchet wheel 100 has a plurality of teeth formed on the outer surface along circumference of the ratchet wheel 100, a friction member 18 is located between the ratchet wheel 100 and the station element 7. A L-shaped slot 72 disposed on the station element 7, a metal spring tab 10 is generally L-shaped disposed in the slot 72, one end of the metal spring tab 10 connect with the station element 7 fixedly via a press member 12, the other end of the metal spring tab 10 is a free end which contact with the ratchet wheel 100 elastically, it causes an elastically impact between the ratchet wheel 100 and the metal spring tab 10 when the ratchet wheel 100 rotates over each tooth of the a plurality of teeth, such that a clear sound is made at the same time. It is easy to those skilled in the art that replace the metal spring tab 10 by other elastic members according to the present invention.

Figure 4:
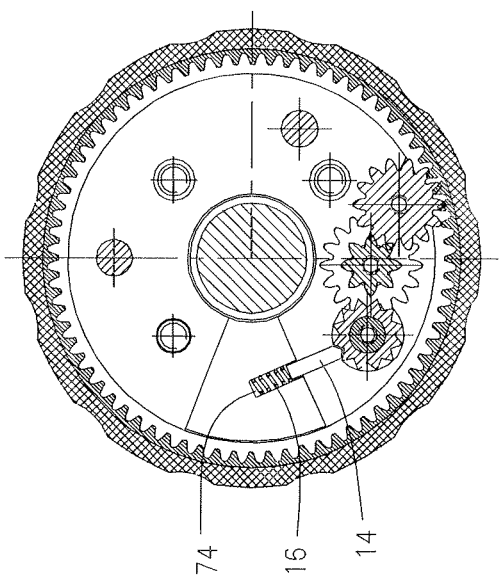
FIG. 4 is a schematic view of a spring member according to a second preferred embodiment of the present invention.

Referring to FIG. 4, the station element 7 provided with a guide groove 74 which has two ends with one end is closed and the other end is opened, a spring member comprises an insert member 14 is movably received in the guide groove 74 and a spring 16 coupled with the close end with its one end and connect with the insert member 14 with its other end, the insert member 14 has a free end which is formed as a V-shaped tip which press against the ratchet wheel 100 under the elasticity of the spring 16, The ratchet wheel 100 turned over each tooth, there will make an elastic impact between the ratchet wheel 100 and the insert member 14, and a sound will sent out at the same time according to each elastic impact.

The ratchet wheel 100 rotates at a high speed and impacts with the spring 16 of the spring F\member When the torque sleeve 3 rotates about the axis X1, a continuous and exact sound is made simultaneity. If the sound frequency is more than 40, it conform to the ergonomics and cause the operator to pay attention, so it is better to remind of the operator. In the three embodiment of the present invention, about 200 times impact will be made between the ratchet wheel 100 and the spring member when the torque sleeve 3 rotate over a circle. However, it is easy to those skilled in the art to change the frequency of the impact between the ratchet wheel 100 and the spring member by setting different transmission rate of the speed increase mechanism 9. Referring to FIG. 3, in the first embodiment of the present invention, a friction member 18 is located between the ratchet wheel 100 and the station element 7 which increase the friction between the speed increase mechanism 9 and the station element 7, such that the torque sleeve 3 is locked on the speed increase mechanism 9 and prevented from reversing when the torque sleeve 3 is not in use.

Figure 5:
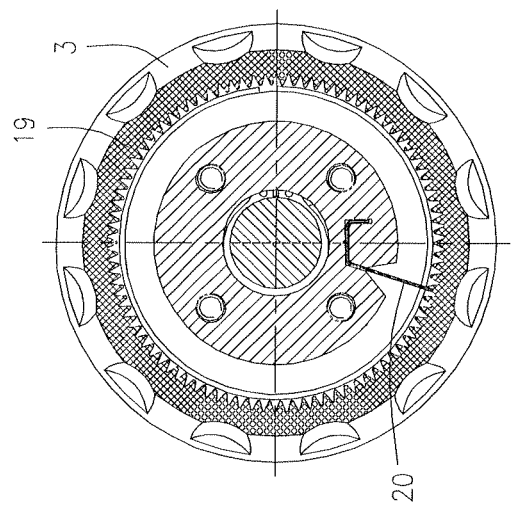
FIG. 5 is a schematic view of the third preferred embodiment of the present invention.

According to the design of the present invention, It is easy to those skilled in the art to make other mechanism for increasing the sound frequency. Referring to FIG. 5, The torque sleeve 3 has a ratchet ring 19 disposed on interior surface along its circumference of the torque sleeve 3, the ratchet ring 19 has a plurality of teeth disposed on the inner surface, 90 teeth is perfect in this embodiment of present invention which impacts with a spring member 20 disposed on the station element 7 when the torque sleeve 3 rotate about the axis X1, thereof the station element 7 provide with a guide groove (not shown) similar with the guide groove 74, the spring member 20 is received in the guide groove. About 90 times impact will be made between the ratchet ring 19 and the spring member 20 when the torque sleeve 3 rotate over a circle. It is easy to those skilled in the art to make different ratchet ring which have different number of tooth. The mechanisms that make the frequency of the sound more than 40 is considered within the scope of this invention.

Figure 6:
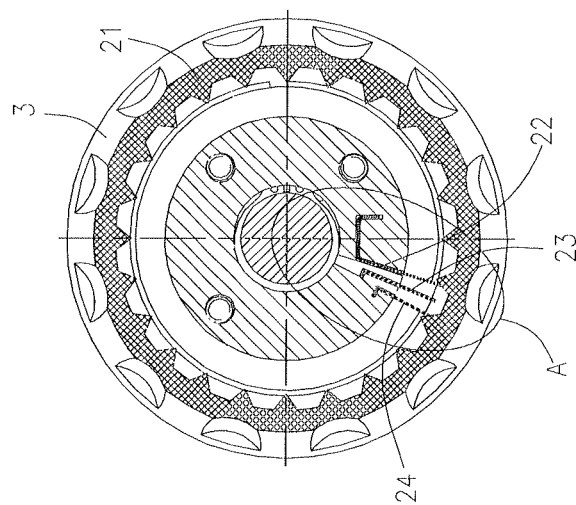
FIG. 6 is a schematic view of the fourth preferred embodiment of the present invention.
Figure 7:
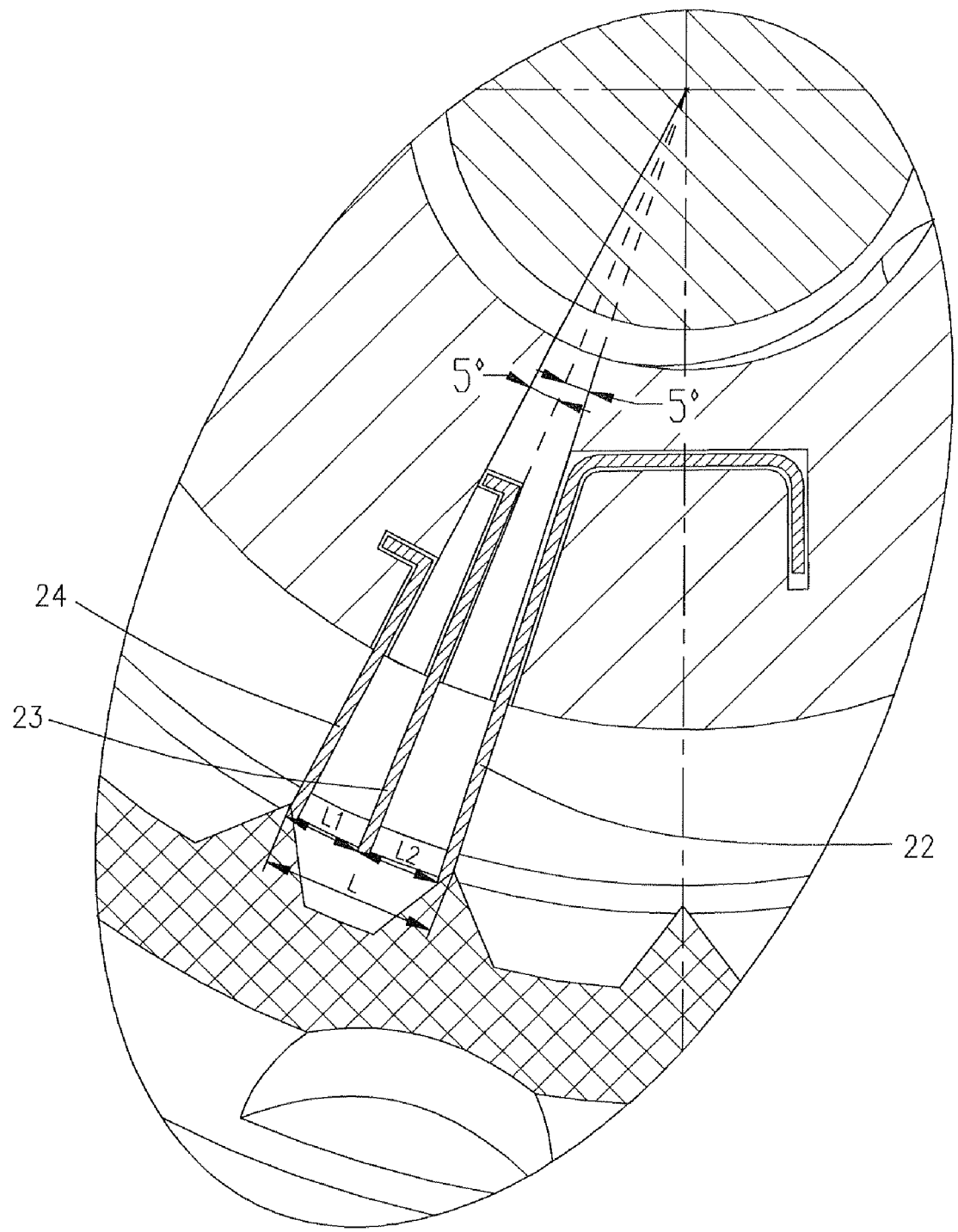
FIG. 7 is a partial enlarged view part A of FIG. 6.

Further referring to FIG. 6 and FIG. 7, a ratchet ring 21 is disposed on the interior surface along its circumference of the torque sleeve 3, the ratchet ring 21 has a plurality of teeth disposed on the inner surface, the number of the teeth is less than 25, a plurality of spring members 22 are respectively located in the different position of the station element 7, the spring members 22 are disposed according to a given phase difference, an optimal given phase difference should satisfy a measure value, as well as the angle between every two proximate teeth of the ratchet ring 21 is approximately equal to the product of the number of the spring members and the given phase. According to the fourth preferred embodiment of the present invention, there are three spring members 22,23,24 disposed on the station element and the total 24 teeth are disposed on the ratchet ring, the phase difference between every two proximate spring members can be calculated according to foregoing method, as well as use the 360 degree divide the number 24 of the teeth and get the angle value between every two proximate teeth of the ratchet ring 21, and then use the angle value divide the number 3 of the spring members get the phase difference of every two proximate spring members. In this embodiment the phase difference of every two proximate spring members is 5 degree. The spring members 22,23,24 impact with the same tooth of ratchet ring in turn when the torque sleeve 3 rotates about the axis $X_1$, so total 72 times impact will be made between the ratchet ring 21 and the spring member 22,23,24 when the torque sleeve 3 rotate over a circle.

The phase difference described above can be considered the distance $L_1$ between the free end of the first spring member 21 and the second spring member 22 which is approximately equal to the distance $L_2$ between the free end of the second spring member 22 and the third spring member 23, the sum of $L_1$ and $L_2$ is approximately equal to the distance $L$ between every two teeth.

It will be apparent to those skilled in this art that various modifications or changes can be made to the elements of the present invention without departing from the spirit of this invention. Accordingly, all such modifications and changes also fall within the scope of this invention.

The invention claimed is:

1. A power tool comprising:
   an adjusting mechanism, the adjusting mechanism comprises a station element defining at least a first engage member, and
   an adjusting member rotating about an axis to drive the first engage member to move elastically along the axis,
   wherein a frequency increase mechanism is disposed between the adjusting member and the station element, and the first engage member is coupled to the frequency increase mechanism, and the frequency of the elastic movement of the first engage member increases when the adjusting member rotates about the axis, and, wherein the frequency increase mechanism comprises at least a speed increase gear mechanism, wherein the adjusting member has an internal gear and the speed increase gear mechanism is coupled with the internal gear and the first engage member respectively.

2. A power tool defined as claim 1 wherein the first engage member is formed as a metal spring tab with two ends, wherein one end of the metal spring tab coupled with the station element fixedly and the other end is engaged with the speed increase gear mechanism.

3. A power tool defined as claim 1 wherein the station element defines a guide groove with two ends, wherein one end is closed and the other end is open, the first engage member is movably received in the guide groove, wherein a first end of the first engage member is coupled with the closed end of the guide groove via a spring and a second end extends out of the guide groove and is engaged with the speed increase gear mechanism.

4. A power tool defined as claim 1 wherein a friction member is located between the speed increase gear mechanism and the station element which increases the friction force between the station element and speed increase gear mechanism.

5. A power tool comprising:
   an adjusting mechanism, the adjusting mechanism comprises a station element defining at least a first engage member, and
   an adjusting member rotating about an axis to drive the first engage member to move elastically along the axis,
   wherein a frequency increase mechanism is disposed between the adjusting member and the station element, and the first engage member is coupled to the frequency increase mechanism, and the frequency of the elastic movement of the first engage member increases when the adjusting member rotates about the axis, and,
   wherein the frequency increase mechanism comprises at least one second engage member which is located on the station element, wherein there is a phase difference between the second engage member and the first engage member, wherein the adjusting member drives the second engage member and the first engage member in turn to move elastically.

6. A power tool defined as claim 5 wherein the frequency increase mechanism comprises two second engage members.

7. A power tool defined as claim 6 wherein the phase difference between each proximate engage member of the first engage member and the second engage members is 5 degrees.

* * * * *